(12) United States Patent
Grasland et al.

(10) Patent No.: US 7,823,067 B2
(45) Date of Patent: Oct. 26, 2010

(54) PROCESS OF NAVIGATION FOR THE SELECTION OF DOCUMENTS ASSOCIATED WITH IDENTIFIERS, AND APPARATUS IMPLEMENTING THE PROCESS

(75) Inventors: Izabela Grasland, Breteil (FR); Franck Hiron, Chateaubourg (FR); Yves Maetz, Melesse (FR)

(73) Assignee: Thomson Licensing, Boulogne-Billancourt (FR)

( * ) Notice: Subject to any disclaimer, the term of this patent is extended or adjusted under 35 U.S.C. 154(b) by 1003 days.

(21) Appl. No.: 10/852,918

(22) Filed: May 25, 2004

(65) Prior Publication Data

US 2005/0021550 A1    Jan. 27, 2005

(30) Foreign Application Priority Data

May 28, 2003   (FR) .................................. 03 06544

(51) Int. Cl.
*G06F 17/00* (2006.01)
(52) U.S. Cl. .................. 715/719; 715/727; 715/732; 715/822; 715/823
(58) Field of Classification Search ................. 715/727, 715/723, 810, 730, 732, 731, 822, 823, 716, 715/719, 821; 707/102, 101; 725/52, 47
See application file for complete search history.

(56) References Cited

U.S. PATENT DOCUMENTS

| | | | |
|---|---|---|---|
| 5,600,775 A | | 2/1997 | King et al. |
| 5,806,079 A | * | 9/1998 | Rivette et al. ............... 715/512 |
| 6,023,267 A | | 2/2000 | Chapuis et al. |
| 6,243,713 B1 | * | 6/2001 | Nelson et al. ...................... 1/1 |
| 6,526,219 B1 | | 2/2003 | Posa et al. |
| 6,546,405 B2 | * | 4/2003 | Gupta et al. ................. 715/233 |
| 2001/0025375 A1 | | 9/2001 | Ahmad et al. |
| 2003/0101164 A1 | * | 5/2003 | Pic et al. ......................... 707/1 |
| 2003/0103645 A1 | * | 6/2003 | Levy et al. .................. 382/100 |
| 2003/0194200 A1 | * | 10/2003 | Yuen et al. ..................... 386/46 |
| 2003/0208771 A1 | * | 11/2003 | Hensgen et al. ............. 725/100 |
| 2004/0025185 A1 | * | 2/2004 | Goci et al. ..................... 725/92 |
| 2004/0128317 A1 | * | 7/2004 | Sull et al. ................ 707/104.1 |
| 2005/0058433 A1 | * | 3/2005 | Young .......................... 386/83 |
| 2006/0117339 A1 | * | 6/2006 | Lesenne et al. ............... 725/32 |

FOREIGN PATENT DOCUMENTS

FR           2 752 130       2/1998

* cited by examiner

*Primary Examiner*—William L Bashore
*Assistant Examiner*—Daeho D Song
(74) *Attorney, Agent, or Firm*—Robert D. Shedd; Harvey D. Fried; Joel M. Fogelson

(57) ABSTRACT

The present invention relates to a process for navigation within a set of audiovisual documents in an audiovisual apparatus. At least one document is recorded previously in the apparatus. Next, the apparatus receives a command of association of at least one identifier with the recorded document. Finally, the apparatus receives navigation commands for navigating around the list of recorded documents, the identifier or identifiers associated with the document is automatically reproduced when this document is selected.

The invention also relates to an apparatus able to execute a software navigation module for using the process.

According to improvements, the identifier is a video sequence, an audio sequence, a text or a still image.

8 Claims, 8 Drawing Sheets

PROCESS OF NAVIGATION FOR THE SELECTION OF DOCUMENTS ASSOCIATED WITH IDENTIFIERS, AND APPARATUS IMPLEMENTING THE PROCESS

This application claims the benefit, under 35 U.S.C. §365 of French Patent Application 0306544 May 28, 2003.

FIELD OF THE INVENTION

The invention relates to a process of navigation in a list of available audiovisual documents of an audiovisual apparatus, and to an apparatus allowing such navigation. The invention applies more particularly when the list comprises identifiers dependent on user-defined criteria.

BACKGROUND

Nowadays, numerous mass market apparatus installed in a user's home receive audiovisual documents, store them and reproduce them on demand. These documents are associated with descriptive data, called <<service information >> in the standard relating to DVB-SI or <<metadata>> in TV-Anytime. These data contain for example the title of the document, the producer, the director, a summary, etc. These apparatus possess a user interface which utilizes the descriptive data received to compile menus displayed on a television screen. By virtue of these menus, the user can navigate around the documents, choose one of them as a function of the data displayed, then view it on an audiovisual apparatus. Patent application FR96/09679 filed by the applicant describes a process for selecting television programs and a device integrating a graphical interface allowing the user to navigate within lists of programs. The menus described in this patent application allow the user to ascertain the general content of an audiovisual transmission and thus to choose the latter according to his tastes.

With the increase in the number of transmission channels and therefore in the number of audiovisual documents available through such networks, the user is afforded a very large number of documents accessible from his apparatus. A standard user interface consists in displaying a list of the identifiers of the documents available. Owing to the large number of documents available, the providers of audiovisual contents create fairly long identifiers so as to properly define each document. After having downloaded or recorded a certain number of documents, the user has at his home a personal media library from which he can select documents so as to reproduce them. The selection is made on the basis of the identifier defined by the contents provider. The size of this identifier being fairly significant and that of the screen being limited, the user interface can display only a restricted number of identifiers. Therefore, the user must sometimes scroll through numerous screen pages before arriving at the right document. One solution consists in truncating the identifiers but this may cause confusion and selection errors. There is therefore a real need to provide high-performance tools allowing a user to easily retrieve a document that he has recorded previously.

The introduction of digital networks has seen the appearance of mass storage means, digital TV decoders also permitting access to Internet type networks within the home, and very high-performance means associating the display of texts and of pictures or sounds. Tomorrow's user will be faced with a very significant quantity of multimedia documents of various types such as audio, videos, pictures, text, application/services, etc. The user interfaces must henceforth allow the user to navigate within such multimedia databases and to find the documents that the user desires, and to do so in a high-performance and user-friendly manner.

Document US 2001/025375—BHADKAMKAR NEAL describes a user interface which associates an additional data item (metadata) of the stream and makes it possible to use this to rapidly locate contents. This user interface makes it possible to view fields containing metadata, but these fields cannot be parameterized and the user is limited in the choices provided by the broadcaster. Therefore, during navigation, only the identifiers provided by the broadcaster are available to the user for choosing his document. If these identifiers do not remind him of anything, he is unable to choose his document.

Document U.S. Pat. No. 6,526,219—POSA describes a user interface which displays additional data. The user can choose an imagette from among a choice provided by the broadcaster. The imagettes appear as tabs representing the recorded content. By activating the imagette, he can reproduce a specific passage in the video directly. As with the previous document, this interface is not flexible and does not make it possible to offer the user numerous possibilities.

Document U.S. Pat. No. 5,600,775—KING describes a user interface allowing a user to associate annotations with a document. Thereafter, during reproduction, the annotation is reproduced automatically. The program guide used in this document displays elements provided by the broadcaster, these elements may be unknown to the user. The latter must therefore firstly reproduce the document to display the annotations thereof and thus see whether the document is indeed the one that he wants. However, this document does not teach that during navigation the display screen offers elements other than those sent by the broadcaster, which elements could be better known to the user.

The present invention proposes a high-performance and user-friendly novel concept for navigating among a set of audiovisual documents, allowing a user to select the desired document easily and in a dependable manner.

SUMMARY OF THE INVENTION

A subject of the invention is a process of navigation within a set of audiovisual documents in an apparatus equipped with display means, comprising a step of recording a plurality of documents in the apparatus, each document being associated with first identifiers; wherein it furthermore comprises the steps of:

b) introduction by a user of at least one command of association between at least one second identifier chosen by the user and a recorded document, c) navigation within the list of documents, while displaying the first and second identifiers associated with the selected document.

Thus, the user can navigate among a list of the documents available within his apparatus. The navigator highlights a document of the list and reproduces the associated identifier, thereby allowing the user to better recall this document and to select it in full knowledge of the facts.

According to a first improvement, an identifier is created within the apparatus on the basis of the document. The association command received parameterizes the manner in which the apparatus creates the identifier, in this way the user can choose from a menu which type of association he wishes to effect. According to a variant, the identifier is received in the apparatus and associated by the association command.

According to an improvement of this variant, it is the user who manually introduces the identifier with the aid of the user interface of the apparatus.

According to another improvement, the apparatus displays a page of first and second identifiers associated with part of the documents, one of these identifiers being highlighted. According to another improvement, the apparatus displays a list of the types of identifiers that the apparatus can associate with a document. The user selects from this list that one or those that he wishes to assign to the previously chosen document.

According to another improvement, at least one identifier is a sound sequence. The navigation step then comprises a step of reproduction of the sound sequence when the associated document is highlighted. In this case and according to an improvement, if no displayable identifier is associated with the document, an identifier associated with the document during recording thereof is displayed at the same time as the reproduction of the sound sequence. This displayed identifier can originate from the same provider as that of the document.

According to another improvement, the apparatus can reproduce the identifiers automatically. The identifiers corresponding to each document are reproduced in succession for a determined duration.

This invention is also an audiovisual apparatus comprising a central unit, a means of recording documents, a means of reproduction of first identifier of the said documents defined by the documents provider, a means of reception of a navigation command making it possible to navigate within the list of recorded documents; wherein it comprises a means of introduction of at least one command for establishing an association between at least one second identifier and a recorded audiovisual document, the second identifiers thus associated being automatically reproduced when at least one first identifier is highlighted by a navigation command with a view to the selection of the associated document.

BRIEF DESCRIPTION OF THE DRAWINGS

Other characteristics and advantages of the invention will now appear with greater details within the framework of the description which follows of exemplary embodiments given by way of illustration and referring to the appended figures which represent.

DETAILED DESCRIPTION

Figure 1:
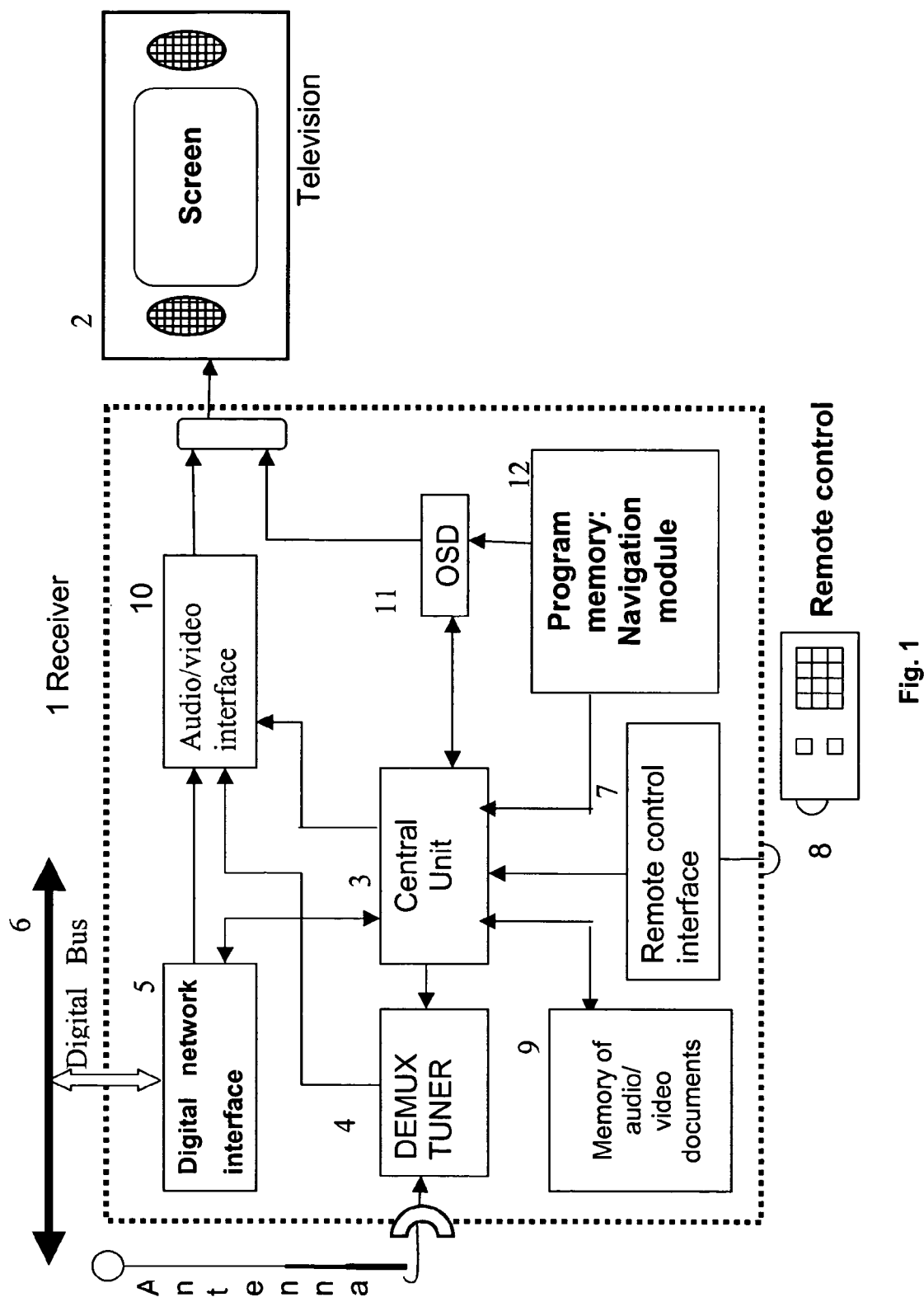
FIG. 1 is a block diagram of a multimedia apparatus for the implementation of an exemplary embodiment of the invention.

The manner-of operation of a multimedia receiver 1 furnished with a display and sound reproduction device 2, a television for example, will be described first. The receiver comprises a central unit 3 linked to a program memory 12, and a tuner coupled to a demultiplexer 4 for receiving audio-visual documents from a transmission network with the aid of a receiving antenna. Optionally, the receiver can also comprise an interface 5 for communication with a high bit rate local digital bus 6 making it possible to receive these audio-visual documents. This network is for example an IEEE 1394 network. The receiver furthermore comprises an infrared signals receiver 7 for receiving the signals from a remote control 8, a memory 9 for storing the audiovisual documents received via the transmission network or via the local digital network 6, and audio/video decoding logic 10 for generating the audiovisual signals sent to the television screen 2. The memory 9 is advantageously a hard disk integrated with the receiver, it may also be a separate element, connected to the receiver and can be remotely interrogated via a domestic network of 1394 type for example. It is important that this memory be under the control of the user so that he can access same at any time. The remote control 8 is furnished with at least the ↑, ↓ direction buttons and with buttons: <<OK>> and <<MENU>> whose functions we shall see later.

The receiver 1 also comprises a circuit 11 for displaying data on the screen, also often called an OSD circuit, standing for "On Screen Display". The OSD circuit 11 is a text and graphics generator which enables menus, pictograms (for example, a number corresponding to the station being viewed) to be displayed on the screen and which makes it possible to display the navigation menus in accordance with the present invention. The OSD circuit is supervised by the Central Unit 3 and a navigator 12. The navigator 12 is advantageously embodied in the form of a program module recorded in a read-only memory. It may also be embodied in the form of a special-purpose circuit of ASIC type for example.

The digital bus 6 and/or the transmission network send the receiver data comprising multimedia documents and data descriptive of these documents. These data originate either from a transmission network, or from the digital network 6. The descriptive data comprise classification elements also called "attributes", accessible multimedia documents. The descriptive data are for example contained in the service information specified in the DVB-SI-standard or in the "metadata" specified by the TV-Anytime forum. These data are stored in the database of the memory 9 of the receiver and are continuously updated. The navigator then extracts the information from this database and processes it so as to produce the navigation menus displayed on the screen.

Figure 2:
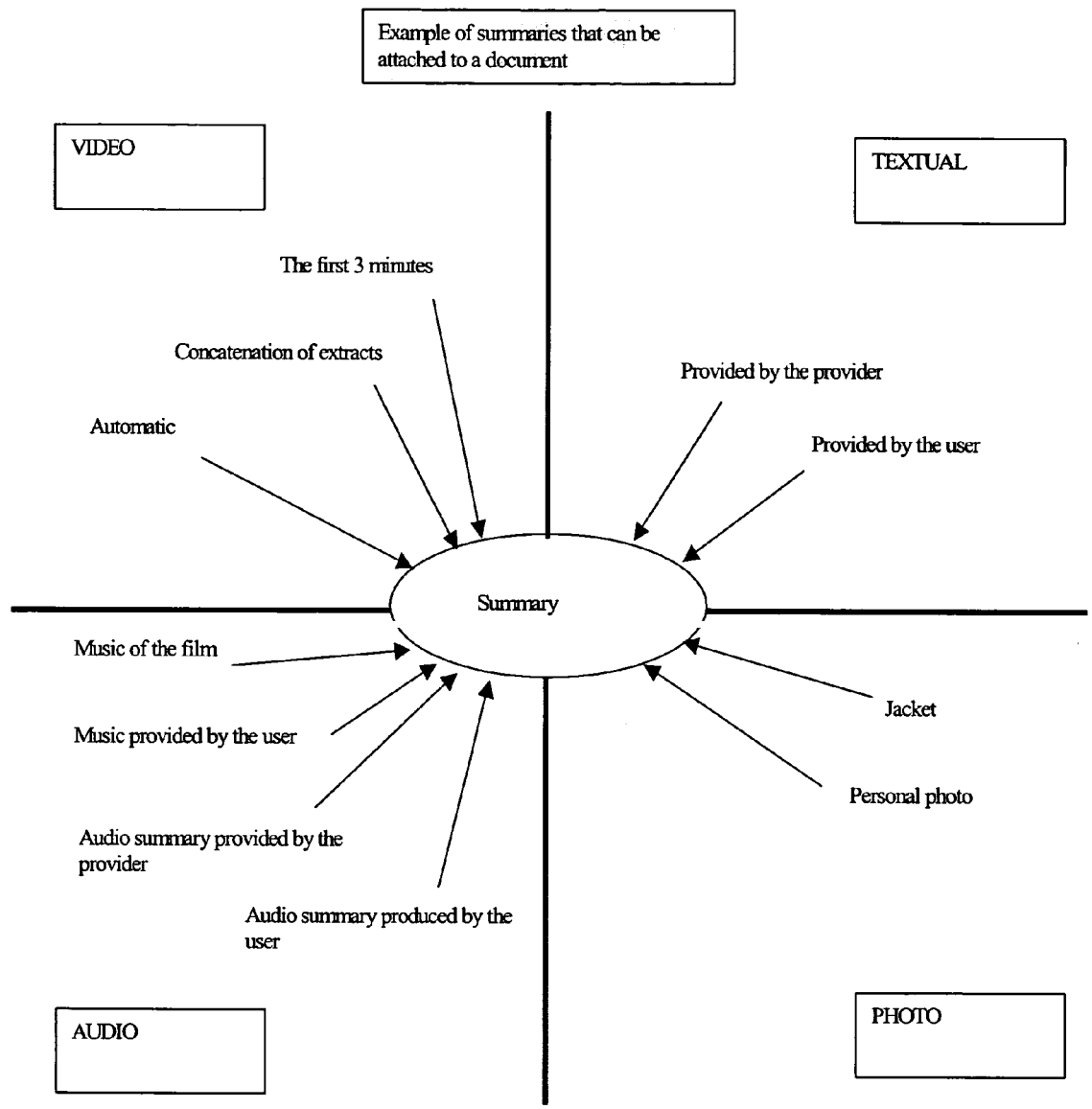
FIG. 2 is a schematic showing the various types of identifiers that the user can associate with a document.

As shown by FIG. 2, it is possible to associate four types of summaries with an audiovisual document:

1—VIDEO: the associated identifier is an animated video sequence, for example, the first three minutes of the document or the video clip. An alternative consists in the navigator analyzing the document as a whole and automatically producing an animated sequence consisting of extracts chosen according to a determined strategy. French Application FR 2816157 published on 3 May 2002 and filed by the applicant describes a way of producing such a summary automatically. Finally, the user can also manually select video extracts from the document, the navigator concatenates these extracts and builds the associated video sequence. Patent Application FR 2816157 also describes a way of producing such a summary manually. In the latter two cases, the summary thus produced is used according to the present exemplary embodiment as identifier.

2—AUDIO: the associated identifier is an audio sequence, for example the music of the film (example: the sound sequence <<The men with harmonica >> by Ennio Morricone for the legendary film <<One upon a time>>. This sound sequence can be transmitted according to an MP3 compressed format in an associated data packet identified by a specific PID. An alternative consists in associating a URL making it possible to download an MP3 file via the Internet. An alternative consists in the user selecting one or more sound extracts (not necessarily musical), the navigator concatenates these extracts to build an audio sequence. An alternative is to select the audio summary provided by the broadcaster. An alternative consists in the user himself providing the audio content to be associated, he can for example speak into a microphone and associate his own commentary with the audiovisual document. A variant consists in the buttons of the remote controls being associated with musical notes, and thus the user composing his own melody which becomes the identifier of the document. Finally, the navigator can analyze the document as a whole and automatically produce an audio sequence consisting of extracts chosen according to a determined strategy, for example the first ten seconds of the pieces of music.

3—TEXTUAL: the identifier is a text to be displayed on the screen, for example a very short summary (two lines maximum) provided by the broadcaster and transmitted in the service information. An alternative consists in the user introducing his own text, the navigator associating the text introduced with the audiovisual document.

4—PHOTO: the identifier is a still image, for example, the poster of the film provided by the broadcaster and transmitted in the service information. An alternative consists in the user selecting an image from the document that he finds particularly representative, the navigator associating this image with the audiovisual document. An alternative consists in the user himself providing the image to be associated with the document.

The user can combine several indicators of various types, for example the poster of the film with the music of the film. As is apparent, the user has a vast choice of identifiers to be associated with the audiovisual document that he has just recorded in his receiver.

Figure 3:
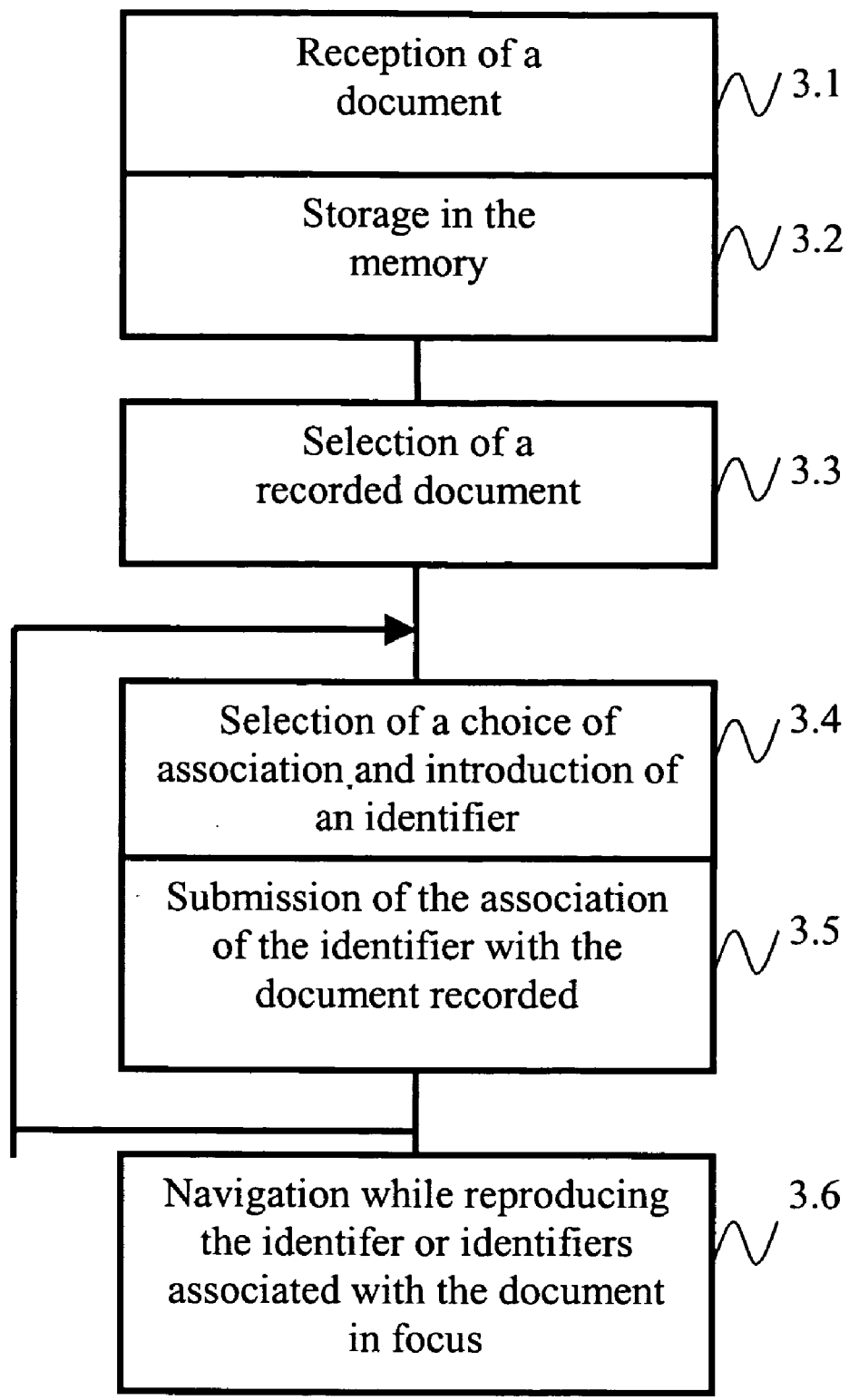
FIG. 3 is an exemplary flow chart of the main steps performed for associating an identifier with a document according to an exemplary embodiment of the invention.

With the aid of the flow chart of FIG. 3, we shall now describe the association between a newly available document and an identifier chosen by the user, and the way in which this identifier is reproduced during navigation.

First, in step 3.1, the user receives a document, that originating from a transmission network, from a bi-directional communication network, or from the reading of a medium (a DVD or a video cassette for example). The user then decides to keep this document, so he records it in the memory 9 of his receiver (step 3.2). Later, in step 3.3 he selects this document, at which point he can view it directly. He then decides to improve the identification of this document by associating therewith an identifier other than that given by the content provider, an identifier which allows him to better recall the document, for example the title <<CASINO>> which is very vague, would be replaced by <<the film Casino by Martin Scorcese with Robert de Niro and Sharon Stone>>.

To do this, he selects a type of association to be assigned to this document (step 3.4), the present exemplary embodiment shows that at least four different types of identifiers exist. Depending on the type selected, the user then has to introduce the identifier that he considers to be the best for him. An improvement consists in the program looping back to this step, thus allowing the user to select other types and thus to associate several identifiers without having to reselect the same document. In step 3.5, he submits the association of the selected identifier with the document. Next, when the user wishes to select a recorded document, he runs his navigator which prompts him with the list of available documents, the identifier associated with the document highlighted by the navigator is reproduced automatically (step 3.6). The reproduction of the audio and/or video identification sequence allows the user to better recall the content of this document, and of its characteristics such as the genre, the actors, the type of music, etc. If it is the identifier introduced by the user which is highlighted, this allows the user to better compile his choice since this choice is based on an identifier that he has determined previously.

Figure 4:
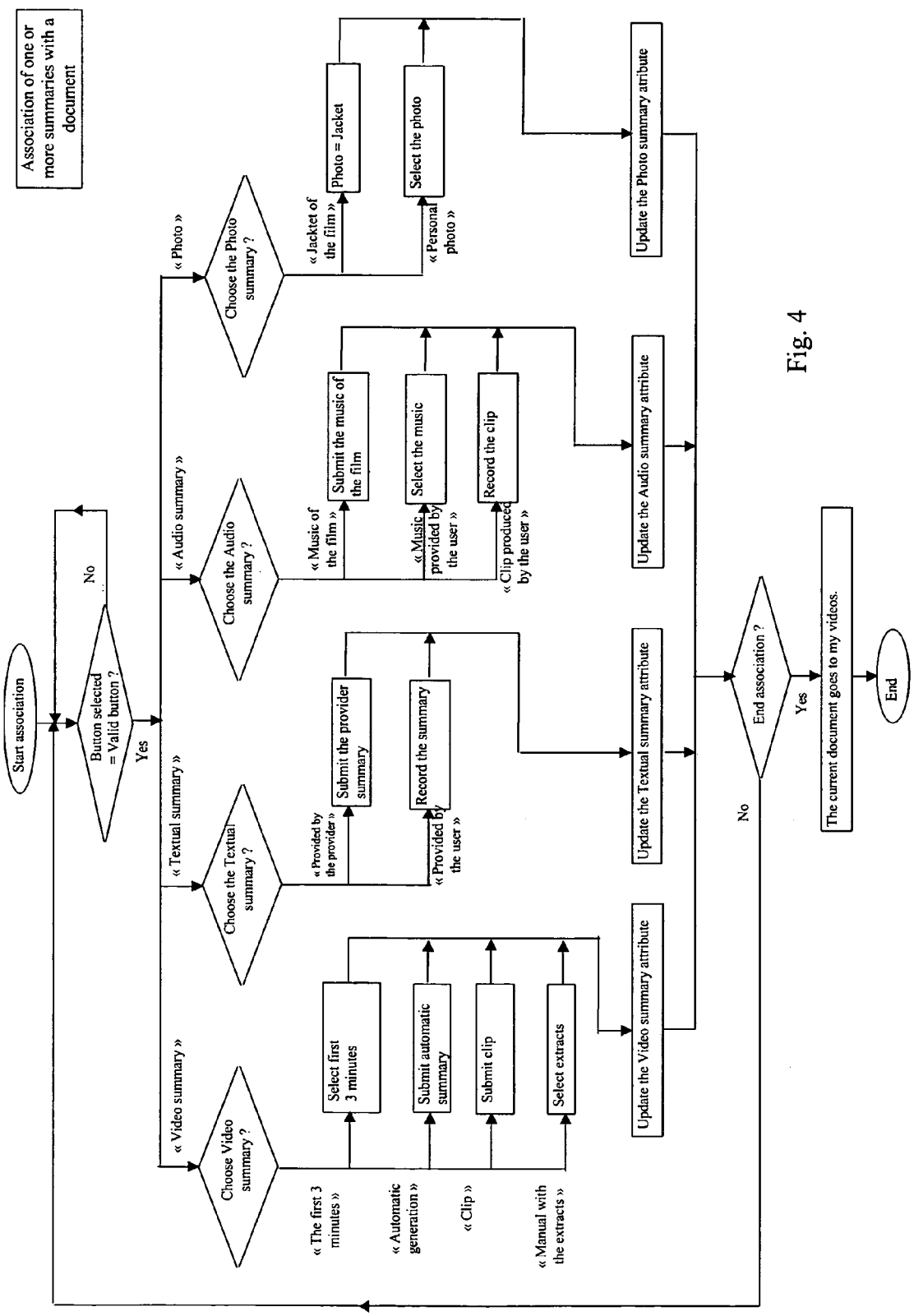
FIG. 4 is an exemplary detailed flow chart of the steps performed for associating an identifier with a document according to an exemplary embodiment of the invention.

The flow chart of FIG. 4 describes a detailed manner of operation of an exemplary embodiment. Shown therein in particular is the selection of the type of identifier and the choices offered to the user for each of the types of identifiers. At the start of the association operation, the user chooses one of the four types mentioned above: VIDEO, AUDIO, TEXTUAL or PHOTO. The selection is made through a menu comprising four icons representing the four types. The user navigates around the types using the direction buttons and positions the focus, then he selects the type thus highlighted with the aid of the <<OK>> button. The action of positioning the focus on an element makes it possible to highlight the latter graphically.

If the user selects <<VIDEO>>, he then has a choice between four options represented by four icons. Either he selects the first 3 minutes, or selects the video clip, or he runs the automatic production by the navigator of a characteristic video sequence of the document, or he has selected manually in the course of reproduction parts of the document which, concatenated one after the other, will constitute a characteristic video sequence of the document. If he chooses manual selection, a submenu makes it possible to navigate around the video contents located either in the memory 9, or on a medium such as a DVD, or on a site downloadable from a URL. These four options are presented in a submenu of the <<VIDEO>> menu by four icons that the user can highlight via the direction keys, the selection is made by pressing the <<ENTER>> button.

If the user selects <<AUDIO>>, he then has a choice between three options represented by three icons. Either he selects the film music transmitted by the content provider, or he manually selects in the course of reproduction sound parts of the document which, concatenated one after another, will constitute an audio sequence, or he loads a sound content into his receiver and associates this content with the document. If he chooses the last option, he chooses from a submenu an audio content located either in the memory 9, or on a medium such as an audio CD or a cassette, or on a site downloadable from a URL.

If the user selects <<TEXTUAL>>, he then has a choice between two options represented by two icons. Either he selects the textual summary transmitted by the content provider, or he introduces a text manually with the aid of the decimal keypad of his remote control. The introduction of an alphabetic text is done in the same way as a <<text message>> in a GSM telephone.

Finally, if the user selects <<PHOTO>>, he then has a choice between two options represented by two icons. Either he selects the audiovisual document's jacket transmitted by the content provider, or he loads a visual content into his receiver and associates this content with the document.

At the end of each of these options, the user submits his choice by pressing the ENTER button, and the association is effected in the memory 9 by the updating of a pointer associated with the audiovisual document stored, the value of the pointer being the value of the storage address of the associated identifier. The user can add identifiers so as to associate several thereof with one and the same document. He can also delete an identifier.

We shall now describe the process consisting in reproducing the associated identifier when the user is searching for an audiovisual document available at the level of his apparatus. The functions of the system are accessible by way of menus that are displayed on the television screen. In addition to the menus, the system has banners that are displayed at the bottom of the screen. Found there are: on-line help, information regarding the transmission in progress, the channel selected, or interactive banners in which the functions available to the user are displayed. The user accesses the various menus with the help of the buttons of his remote control which have the following functions:

<<MENU>> button: displays the main menu 4 navigation arrows UP, DOWN, LEFT and RIGHT: they allow the user to navigate within the system, to select a menu, an item or a function OK submit button: submits the user's choice BACK button: used to return to the previous menu The principle of navigation is organized according to 2 axes: the vertical axis of the screen, from bottom to top and the horizontal axis of the screen, from left to right. The user passes from choice to choice with the help of the navigation arrows of his remote control. When the focus is on a choice, the user can submit this choice by pressing the OK button of his remote control. If the user presses the BACK button of his remote control, he returns to the previous screen, that is to say the one which was displayed just before the user pressed the OK button. If the user presses the MENU button of his remote control, he returns to the main menu. The user can, from the main menu, access submenus, in particular to select a subtype of identifiers.

Figure 5:
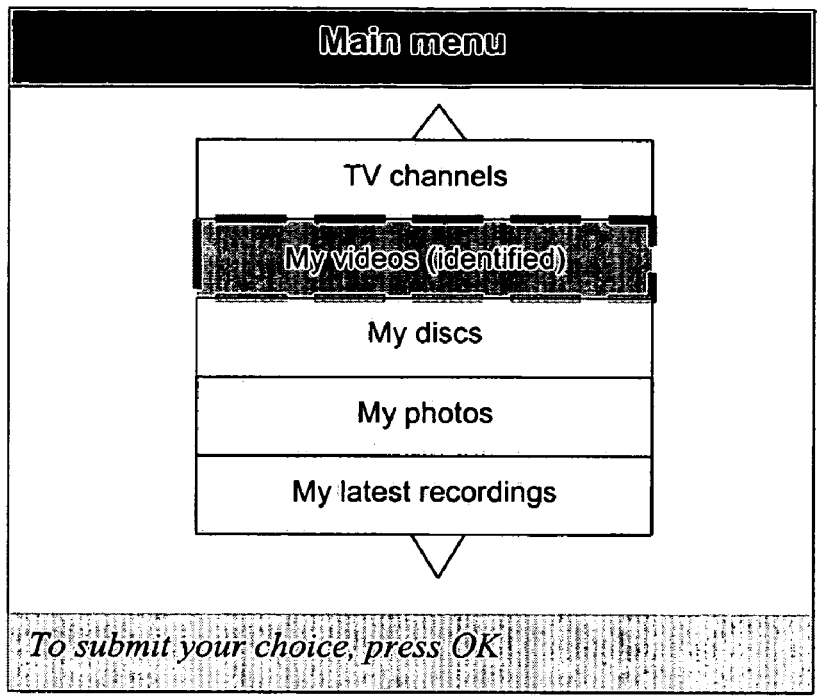
FIG. 5 shows a screen shot of the main menu according to an exemplary embodiment of the invention.
Figure 6:
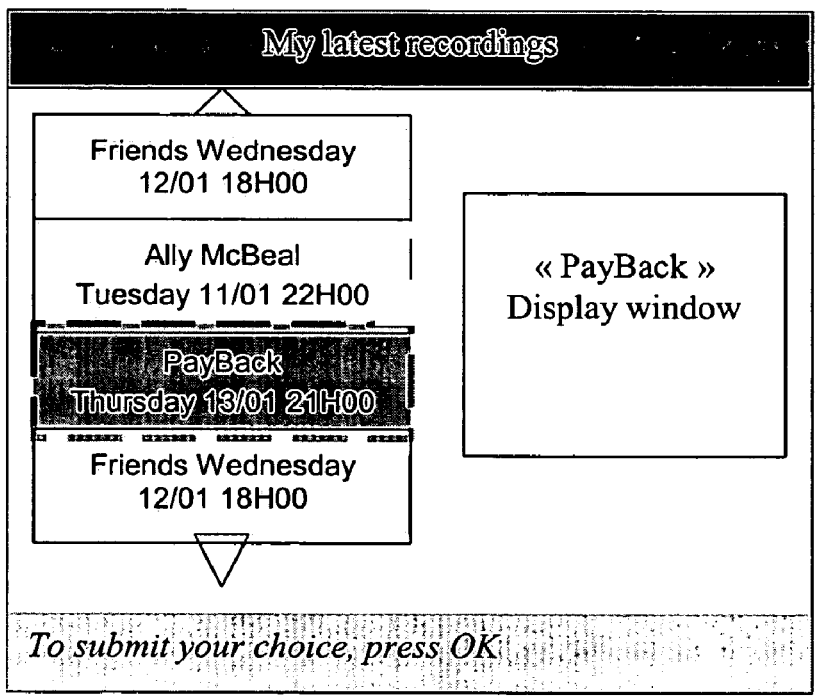
FIG. 6 shows a screen shot presenting the list of available documents that have not yet been associated with an identifier.

The main menu displayed on the screen looks like the shot represented in FIG. 5. The fifth element called ((My latest recordings >>makes it possible to access the video recordings saved in the memory 9 and for which the user has not yet associated any identifier. The second element dubbed <<My videos>> allows the user to access the documents saved by virtue of the previously associated identifier. Suppose that the user selects the <<My latest recordings>> submenu, the screen shot of FIG. 6 is then displayed. Each document recorded and not yet associated with an identifier appears as an element of a list. At this juncture, the document is identified by its title provided by the producer as well as the date and the time of recording in the receiver 1. The user can navigate around this list with the help of the direction buttons and can select the element by pressing the <<OK>> button. The right part of the screen contains a graphical window wherein is displayed the document recorded corresponding to the element in focus.

Figure 7:
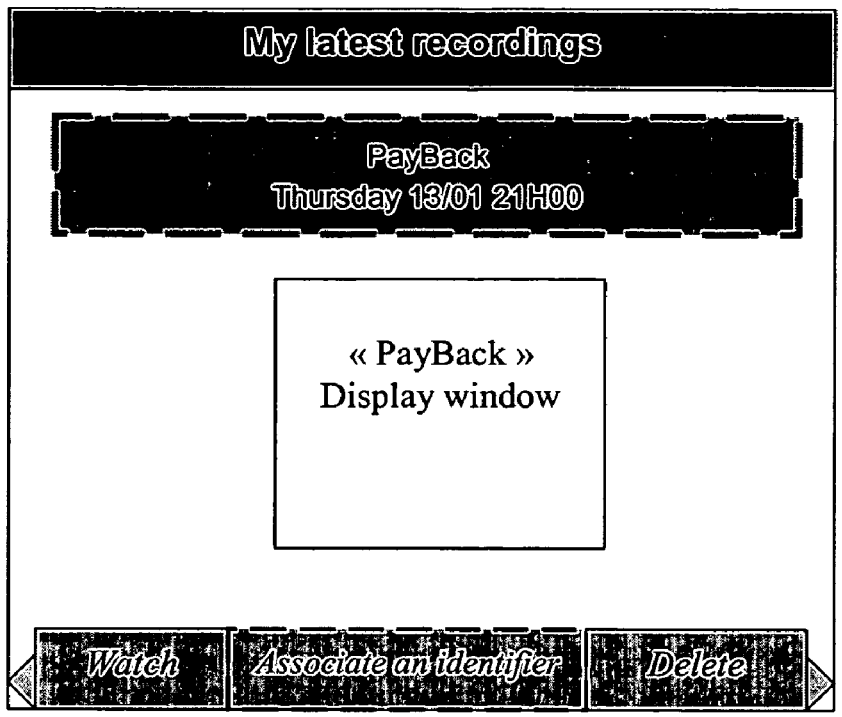
FIG. 7 shows a screen shot when a document that has not yet been associated with an identifier has just been selected.
Figure 8:
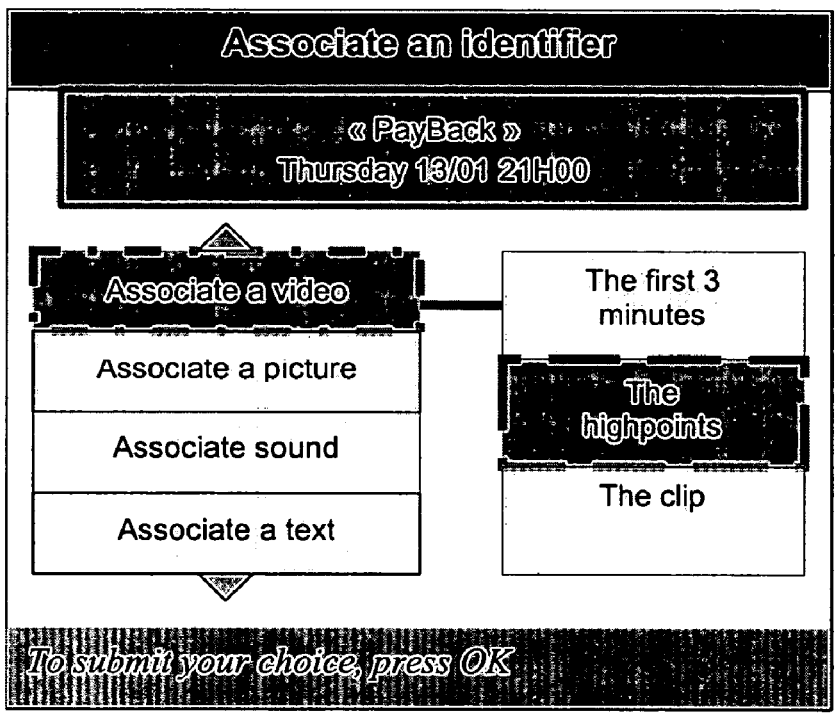
FIG. 8 shows a screen shot presenting the various types of associations offered to the user when he has selected a document.

Suppose that the user selects an element, the film <<PayBack>> for example, the screen shot of FIG. 7 is then displayed. The information displayed on the screen no longer relates to just one element, found therein are the title, the time of the recording, a graphical window displaying the first minutes of the document. A function line appears at the bottom of the screen, it contains three selectable icons. The icon denoted <<Watch>> makes it possible to run the full-screen display of the selected document. The icon denoted <<Delete>> makes it possible to erase the document from the memory 9, thus freeing up some space to store other documents. The third icon makes it possible to instigate the association between the document and an identifier selected by the user. By selecting this third icon, the screen shot described by FIG. 8 is then displayed.

At the top of the screen, a graphical window contains the title of the document such as it is provided by the descriptive data, and optionally the moment of storage thereof in the receiver. In the middle of the screen on the left appears the list of types of associations available, found therein are the four types mentioned previously: VIDEO, AUDIO, PHOTO, TEXTUAL. A single type is selected and is graphically highlighted. The <<UP>> and <<DOWN>> buttons make it possible to change the selection. In the middle of the screen on the left are displayed the subtypes available corresponding to the type selected. For example, when <<Associate a video>> is selected, the user can choose between: the first three minutes, the highlights of the document determined automatically by the receiver or the clip transmitted in the descriptive data. Selection of the subtype is made by pressing the <<RIGHT>> button and by navigating around the list of subtypes with the help of the <<UP>> and <<DOWN>> buttons.

Figure 9:
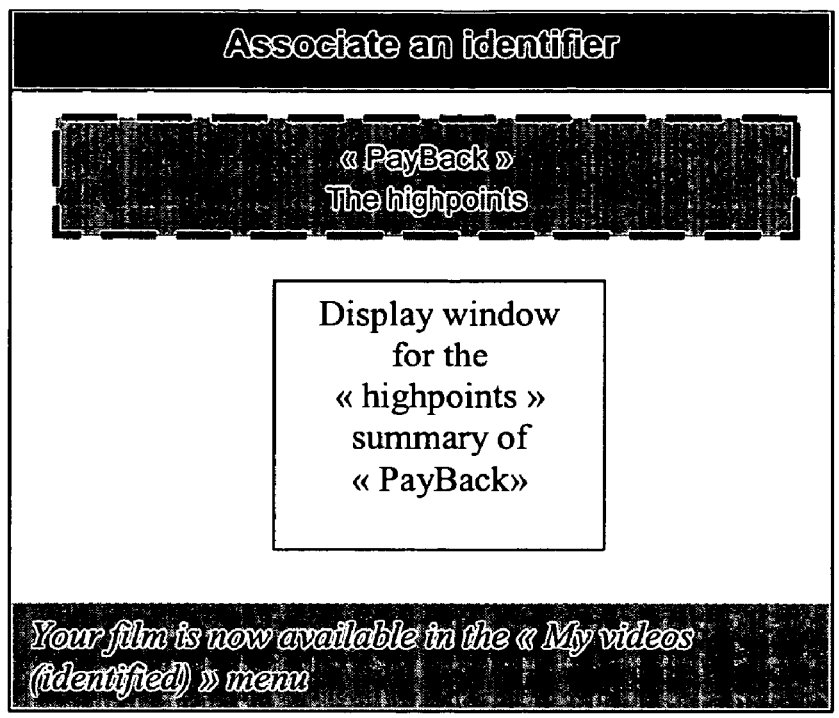
FIG. 9 shows a screen shot following the validation of an association between a document and an identifier.

Suppose that the user has associated the type <<VIDEO>> and <<the highlights>> with the document <<PayBack>>, he submits his choice by pressing the <<OK>>, button. The screen shot of FIG. 9 is then displayed for a few seconds. A message at the bottom of the screen indicates that <<your associated document is now available in your receiver>>. This message disappears at the end of a determined duration or following the receipt of a new command from the user. The association is registered in the memory 9 of the receiver.

Figure 10:
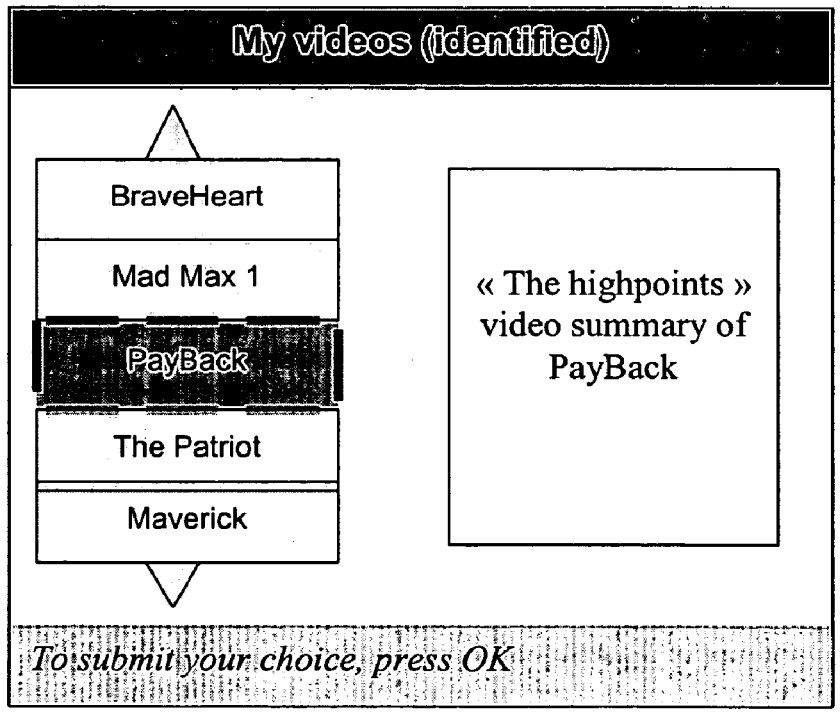
FIG. 10 presents a screen shot when the user navigates within the list of documents available on the basis of his apparatus and associated with an identifier.

Next, the user decides to interrogate the content of his receiver so as to select a document to be displayed. He runs his navigator and the screen shot illustrated by FIG. 10 then appears. In the middle of the screen on the left appears the list of titles of the documents available and having an association, the identifier associated with the document appears on the right. The identifier highlighted may either be that sent by the broadcaster, or that defined previously by the user. In the example of FIG. 10, the film <<PayBack>> is selected from the list, the graphical window on the right shows the highlights selected by the receiver at the time of association. If a document is associated with an identifier of AUDIO type, nothing is displayed on the right of the screen, the receiver reproduces the identifier using sound only. The user can thus better appreciate the genre of the document and recall what it contains. If the user has previously associated only an identifier of audio type, the graphical identifier which appears on the screen is by default that given by the contents provider. By pressing the <<OK>> button, the user instigates the reproduction of the document whose identifier is highlighted. The document then appears in full screen and all the identifiers associated with this document disappear, they are no longer useful since the user has made his choice.

Figure 11:
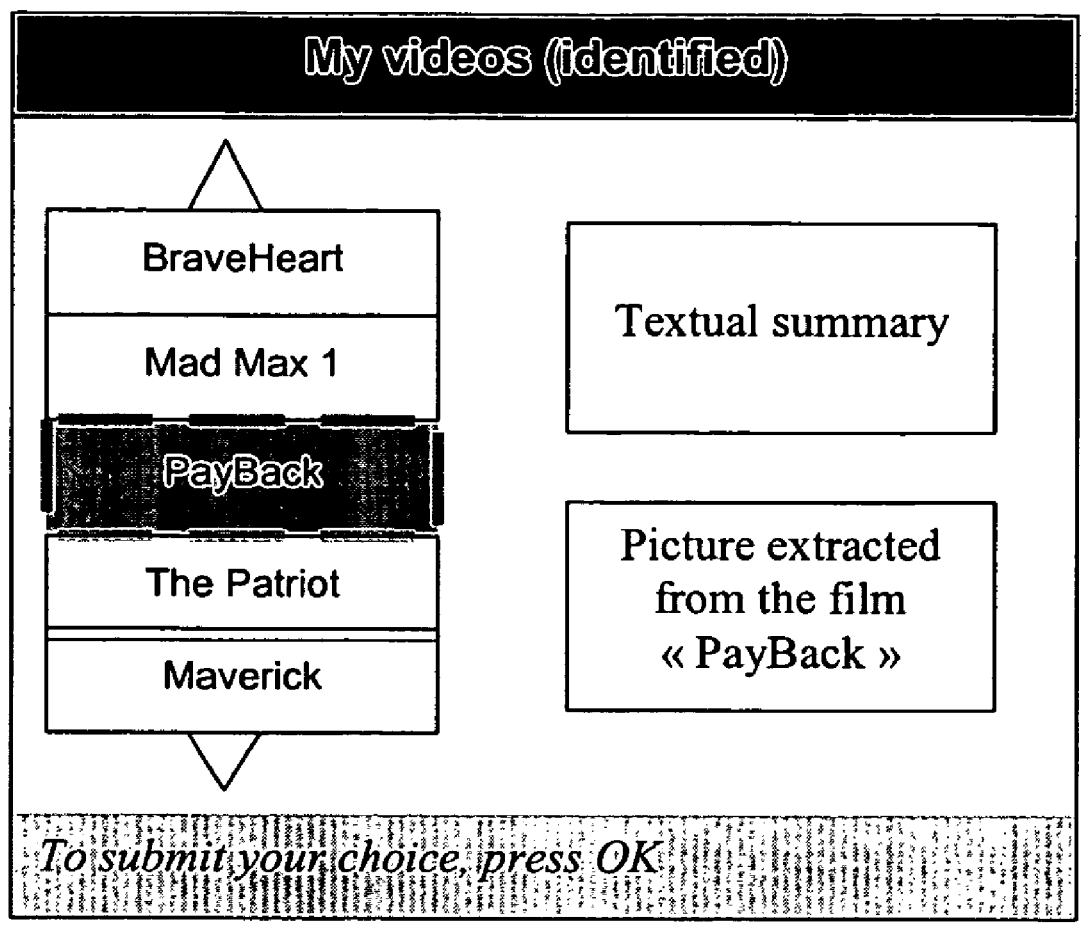
FIG. 11 presents a screen shot showing an improvement when the user navigates within the list of documents available on the basis of his apparatus and associated with several identifiers.

An improvement consists in associating several identifiers with one and the same document. FIG. 11 shows a screen shot presenting a document associated with at least two identifiers, one of TEXT type: the summary such as the broadcaster provides it, and the other of PHOTO type: a picture from the film. Concomitantly with the display, the navigator can reproduce a third identifier, this one sound. This improvement can be effected through the association of a list of identifiers with a document, the navigator runs through the list and extracts all the associated identifiers with a view to reproducing them on the screen and/or towards loudspeakers. At any time, the document having the focus may be reproduced by pressing the <<OK>> button. A <<Delete>> button makes it possible to delete the document from the memory 9, the association is also erased.

Another improvement consists in concatenating the identifiers automatically so as to produce an automatic preview of the documents recorded. The identifiers thus concatenated are of graphical type (video, photo or text). A key on the remote control (or an input of the menu) makes it possible to run the automatic preview of all the contents stored on the receiver. This amounts to playing a clip consisting of strings of identifiers. When the user is interested in the document currently highlighted by the navigator, he presses the <<OK>> button, scrolling is then interrupted and the document selected appears in full screen.

Although the present invention has been described with reference to the particular embodiments illustrated, it is in no way limited by these embodiments, but is so only by the appended claims. It will indeed be noted that any means of navigation equivalent to the direction buttons is applicable for the implementation of the invention.

The invention claimed is:

1. A process for navigating a list of identifiers of a plurality of audiovisual documents in an apparatus comprising:
   a) recording a document of the plurality of documents in the apparatus, each of the documents associated with a first identifier;
   b) selecting one of the recorded documents;
   c) displaying a list of types of at least one second identifier to be associated with the selected document and selecting at least one type from said list;
   d) creating the at least one second identifier by extracting at least one of an audio and video part of the audiovisual content of the selected document, the extracted part relates to the selected type;
   e) associating the at least one second identifier with the selected document, wherein the association is performed by a user during the reproduction of said selected document and said user manually selects a video sequence of said selected document; and
   f) navigating within a list of identifiers of recorded documents while reproducing the at least one second identifier when the first identifier for the selected document is highlighted
   g) concatenating said selected video sequence with other video sequences which have been selected using said at least one second identifier.

2. The process according to claim 1; wherein the at least one second identifier is a sound sequence, and step f) comprises reproducing the associated sound sequence when the first identifier for the selected document is highlighted.

3. The process according to claim 1 further comprising automatically reproducing the first identifier and the at least one second identifier, the at least one second identifier being reproduced for a determined duration.

4. The process according to claim 1 wherein during the step f) one of the at least one second identifiers is highlighted and reproduced.

5. An audiovisual apparatus, comprising:
   a means of recording a plurality of documents in the apparatus, each of the documents associated with a first identifier;
   means for selecting one of the recorded documents;
   means for displaying a list of types of at least one second identifier to be associated with the selected document;
   means for selecting the at least one type from said list;
   means for creating the at least one second identifier by extracting at least one of an audio and video part of the audiovisual content of the selected document, the extracted part relates to the selected type;
   means for reproducing video of said at least one recorded document;
   means for associating the at least one second identifier with the selected document, wherein the association is performed by a user during the reproduction of said selected document and said user manually selects a video sequence of said document; and
   means for navigating within a list of identifiers of the recorded documents and reproducing the at least one second identifier when the first identifier for the selected document is highlighted, wherein said apparatus will concatenate together said selected video sequence with other video sequences which have been selected using said at least one second identifier.

6. The audiovisual apparatus according to claim 5, wherein the at least one second identifier is a sound sequence said apparatus further comprising:
   means for reproducing the associated sound sequence associated with the selected document.

7. The audiovisual apparatus according to claim 5, further comprising:
   means for automatically reproducing the at least one second identifier associated with the selected document, the at least one second identifier being reproduced for a determined duration.

8. A process for navigating a list of identifiers of a plurality of audiovisual documents in an apparatus comprising:
   a) recording a document of the plurality of documents in the apparatus, each of the documents associated with a first identifier;
   b) selecting one of the recorded documents;
   c) displaying a list of types of at least one second identifier to be associated with the selected document and selecting at least one type from said list;
   d) creating the at least one second identifier by extracting at least one of an audio and video part of the audiovisual content of the selected document, the extracted part relates to the selected type;
   e) associating the at least one second identifier with the selected document, wherein the association is performed by a user during the reproduction of said selected document and said user manually selects an audio sequence of said selected document; and
   f) navigating within a list of identifiers of recorded documents while reproducing the at least one second identifier when the first identifier for the selected document is highlighted
   g) concatenating said selected audio sequence with other audio sequences which have been selected using said at least one second identifier.

* * * * *